United States Patent [19]

Hyde et al.

[11] Patent Number: 5,411,788
[45] Date of Patent: May 2, 1995

[54] HEAT-SEALABLE ORIENTED WEB

[75] Inventors: Patrick D. Hyde, Mendota Heights; Andrew J. Ouderkirk, Woodbury, both of Minn.

[73] Assignee: Minnesota Mining and Manufacturing Co., St. Paul, Minn.

[21] Appl. No.: 229,168

[22] Filed: Apr. 18, 1994

Related U.S. Application Data

[62] Division of Ser. No. 047,807, Apr. 15, 1993, Pat. No. 5,328,653.

[51] Int. Cl.$^6$ ............................................. B32B 7/00
[52] U.S. Cl. ................................ 428/200; 428/174; 428/332; 428/336; 428/337; 428/338; 428/339; 428/345; 428/349; 428/424.8
[58] Field of Search ............................ 427/536, 557; 156/308.2, 311; 264/555; 428/174, 200, 332, 336, 338, 339, 345, 349, 424.8

[56] References Cited

U.S. PATENT DOCUMENTS

| | | | |
|---|---|---|---|
| T927,010 | 11/1973 | Whitfield | 264/210 R |
| 2,632,921 | 1/1949 | Kreidl | 18/47.5 |
| 2,746,084 | 3/1953 | Kreidl | 18/1 |

FOREIGN PATENT DOCUMENTS

| | | | |
|---|---|---|---|
| 0038559 | 4/1981 | European Pat. Off. | B29C 25/00 |
| 0308205A2 | 9/1988 | European Pat. Off. | B29C 59/04 |
| 280509 | 5/1952 | Switzerland . | |
| 851053 | 10/1960 | United Kingdom . | |

*Primary Examiner*—Patrick J. Ryan
*Assistant Examiner*—Richard C. Weisberger
*Attorney, Agent, or Firm*—Gary L. Griswold; Walter N. Kirn; William J. Bond

[57] ABSTRACT

A heat-sealable oriented film or layer of a semi-crystalline thermoplastic polymer. The film has a thin, heat-sealable layer of the same thermoplastic polymer having a different heat-seal temperature, which layer is heat-sealable without requiring fusion of the entire film. There is also provided a method for producing the claimed heat-sealable film.

19 Claims, 3 Drawing Sheets

HEAT-SEALABLE ORIENTED WEB

This application is a divisional of Ser. No. 08/047,807 filed Apr. 15, 1993, now U.S. Pat. No. 5,328,653.

BACKGROUND AND FIELD OF THE INVENTION

The present invention relates to a process of forming a thin, heat-sealable layer on an oriented web.

The use of oriented films and fibers is widespread, particularly with semi-crystalline thermoplastic polymers. These oriented products are characterized by high tensile strength and high modulus. Orientation also influences crystalline order and hence the melting or softening point of the oriented polymer comprising the web. A problem with these oriented polymers is their poor heat sealability. Traditional oriented polymer films are heat sealed by the entire film being thermally welded above its melting temperature. This type of heat sealing by welding results in severe shrinkage and warping in the weld region. Welding also destroys the orientation in the weld area resulting in a weakened film or web in this critical area.

Efforts to make oriented semi-crystalline films heat sealable have generally focused on providing a thin layer of a heat sealable polymer on the film outer surface by coextrusion, sequential extrusion or coating. However these processes are problematic in terms of manufacturability of the film and adherence between the two layers. The heat sealable layer being formed of a lower molecular weight, lower softening point and/or less crystalline polymer also typically reduces the bulk tensile properties of the film. U.S. Pat. No. 4,247,591 proposes coextruding a thin outer layer of a higher average molecular weight version of the bulk polymer so both layers are subsequently oriented. The film is then selectively heated in these thin outer layers. The results reported allege an increase in joint strength of about 30 percent over single layer oriented films with a welded joint. Problems with this process include the need for careful selective heating to ensure that the heat seal remains primarily in the high molecular weight outer layers. The process also would not be suited to thin films of less than about 5 mils (127 μm).

Also of concern with oriented films are the high gloss and low abrasion resistance of these films. A series of patents are directed at providing plastic strapping for industrial packaging use. The plastic strapping is formed from oriented polymeric films. The patents address the high gloss and abrasion resistance problems of these oriented films. U.S. Pat. Nos. 3,394,045 and 4,428,720 propose heating the oriented film to a fusion temperature (e.g., about 475° F. (246° C.) for polypropylene) by a flame or heated chromed roll. The depth of treatment is about 1 mil (25.4 μm). The straps can then allegedly be used like conventional steel strapping to form crimped joints. However, this process is not well suited to providing heat sealable films. The high temperature and long dwell time of the treatment results in considerable oxidized species on the outer surface of the strapping, which is not a problem for crimped joints but which contaminates any heat seal joint. The high treatment temperature would also make manufacturability difficult for thin films due to the tendency of relatively thick melted polymer layers to adhere to rollers and associated machinery. U.S. Pat. No. 4,090,008 also reports that the above patents are deficient in preventing dusting or edge fibrillation and proposes a process for sealing only the edges with a heat treatment. U.S. Pat. No. 4,451,524 addresses the same fibrillation problem and purposes a subsequent orientation step following fusion of the surface layer (again about 1 mil (25.4 μm)).

U.S. Pat. No. 4,822,451 summarizes various prior art film surface treatments and their effects, including; corona treatment, plasma treatment, sputter-etching, E-beam treatment, flame treatment, high intensity U.V. treatment and laser treatment. The object of the treatment process discussed in this patent is to treat a very thin surface layer of a film so that there is little or no chemical (except crystalline structure) or textural changes in the film polymer on the outer surface. All the summarized prior art treatments result in a change in the texture and/or chemical nature of the polymer surfaces being treated. The treatment described is a high intensity, high fluence laser (e.g., excimer laser) that when used with an appropriate semi-crystalline polymer creates a, preferably, 20–250 nm thick layer of treated polymer that is in a quasi-amorphous state. The quasi-amorphous state is characterized by loss of short range crystallization, but retains a limited level of long range orientation that can be seen if the treated layer is recrystallized. This treatment requires suitable matching of the laser wavelength to the absorption characteristics of the polymer and does not create any texturing of the treated polymer surface which is desirable in many applications thereby limiting its applicability.

SUMMARY OF THE INVENTION

The present invention provides a thin (e.g., less than about 5 mils (127 μm) heat sealable, oriented, semi-crystalline and thermoplastic article or material such as a web, e.g., a film or film layer, and a method for its production. Heat sealability is provided by a thin heat sealable surface layer of the same polymer and similar crystalline state as the bulk polymer of the web, e.g., film or film layer. The treated surface layer is characterized by a lack of oxidated (e.g., degraded) species and typically increased surface texture. The treated film is particularly well suited for use as a pressure-sensitive adhesive (PSA) tape backing.

DETAILED DESCRIPTION OF THE PREFERRED EMBODIMENTS

The present invention provides a process for formation of a thin heat sealable semi-crystalline surface layer on a semi-crystalline oriented polymer article or web, e.g., an oriented film or film layer, and the article or web of that process. The process involves rapidly heating a thin layer of the oriented polymer, on the outer surface of the article or web, under heat and pressure to a temperature above the melting point of the oriented semi-crystalline polymer by use of a heated textured surface, such as a heated roll for an oriented web. The heating step is of a duration sufficient to treat only a 1 to 15 micron thick layer of the oriented polymer outer surface.

The invention treated surface layers, or surface layer areas or regions, are characterized by a lack of oxygen containing degradation species such as obtained by typical heat treatment processes, like those described in U.S. Pat. Nos. 3,394,045 or 4,495,124 or ablative processes such as described in U.S. Pat. No. 4,417,948. Oxidized species are notably absent in the invention treated surface layer as measured by electron spectroscopy analysis (the treated surfaces typically measured from 99 to 100 percent carbon) (ESCA)(XPS) and water contact angle measurements, which were typically high (measured to be 88° to 95°) compared to prior art treated surface layers(a lower contact angle indicates higher oxygen content based on the higher surface energy).

Figure 1:
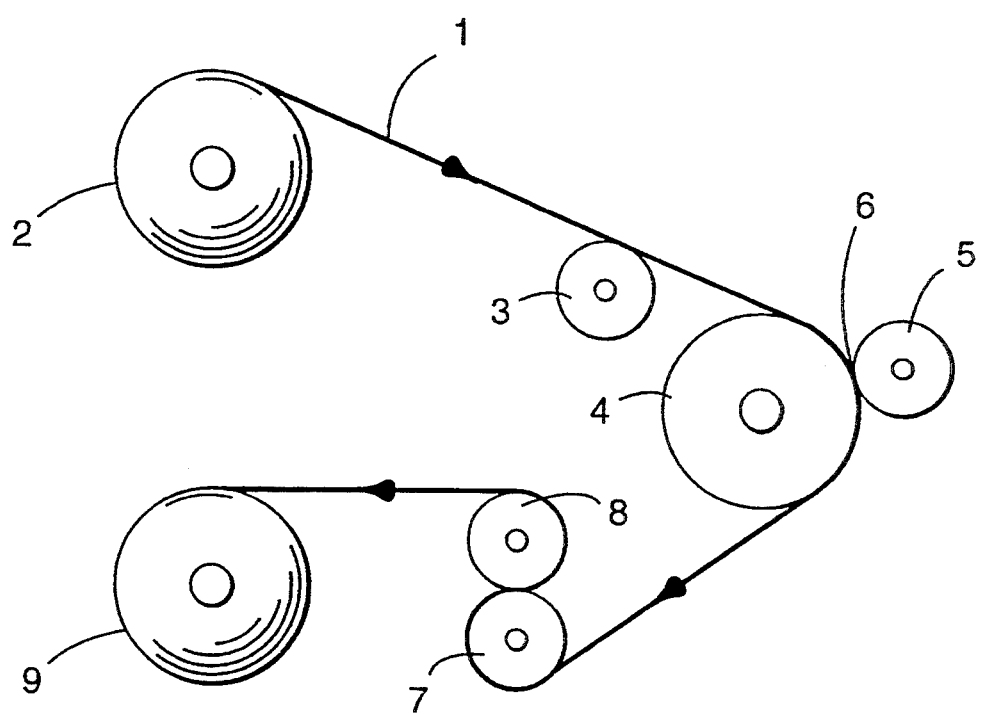
FIG. 1 is a schematic diagram of the treatment process of the invention.

The process of the invention is exemplified and described with reference to FIG. 1. Reference numeral 1 indicates an oriented thermoplastic film supplied by an unwind roller 2 and suitable idler roll(s) 3. The film 1 is fed to a nip 6 formed between a heated textured roll 5 and a backing roll 4, either or both of which can be driven. The heated nip roll 5 is textured, such as a chrome plated sandblasted steel roll. The roll 5 can optionally be provided with a release surface to prevent build-up of high tack melted polymer on the heated roll 5. The roll 5 can be heated by conventional means such as hot water or oil, electric resistance or induction heating.

The surface temperature of roll 5 is controlled so as to have a temperature at least 5° C. above the film 1 oriented polymer melt temperature, preferably at least 30° C. for chromed rolls and generally higher for release coated roll surfaces. The nip contact surface area of the film 1 with the heated roll 5 is generally very small, from about 1 to 10 mm, preferably 2 to 5 mm, however a larger contact area can be used if the film 1 speed is proportionally increased. The film 1 speed through the nip 6 is preferably at least 50 feet (15 M) per minute, and more preferably at least 75 feet (23 M) per minute. The preferred contact time between the film and the heated nip contact area is less than about 20 milliseconds (ms) and preferably less than about 15 ms, down to 5 ms and less. At contact times greater than about 20 ms the treated film layer(s) will have the tendency to oxidize and severely degrade the tensile properties of the film or film layer. This will lead to a film that will not heat seal adequately and may break in the nip. The above described preferred conditions are dependent to some degree on the polymer that forms film 1. Polymers with different viscoelastic properties, rheological properties or thermal conductivity properties may require more or less exposure to the heated roll 5. The preferred conditions described above are primarily with respect to isotactic polypropylene and similar polymers, copolymers and blends.

The backing roll 4 and the heated roll 5 are set to provide a nip pressure sufficient to ensure substantially continuous contact between the film surface being treated and the heated roll 5 (a limited amount of small or microscopic non-contact points between the heated roll 5 and the film 1 is not undesirable and may contribute to clean release of the film from heated roll 5). The pressure required to do this is generally less than the pressure used in a conventional embossing treatment. The high temperature of roll 5 lowers the viscosity of a surface layer of polymer on film 1 sufficient to allow limited viscous flow of the heated polymer into contact with heated nip roll 5 at low pressures. Pressures as low as 0.2 to 10 pounds per linear inch (PLI) (0.09–4.56 kg per linear cm) have been found to be sufficient. At nip pressures greater than 10 PLI, the film has a tendency to distort, creating edge creping. The backing roll 4 is preferably cooled to prevent heat buildup in the nip 6. Backing roll 4 can also be provided with a thin deformable or elastic coating (such as silicone rubber with a durometer hardness of less than about 80 Shore A) to better ensure contact between the film 1 surface and the textured heated roll 5.

Drive roll 7 drives a nip provided between roll 7 and roll 8, one of which is preferably coated with a silicone rubber. Rewind roll 9 is also driven, possibly by drive roll 7.

The film 1 is a semi-crystalline polymer that has been subjected to orientation in at least one direction to provide non-isotropic behavior in the film. This orientation is conventional and will not be described here.

Figure 2:
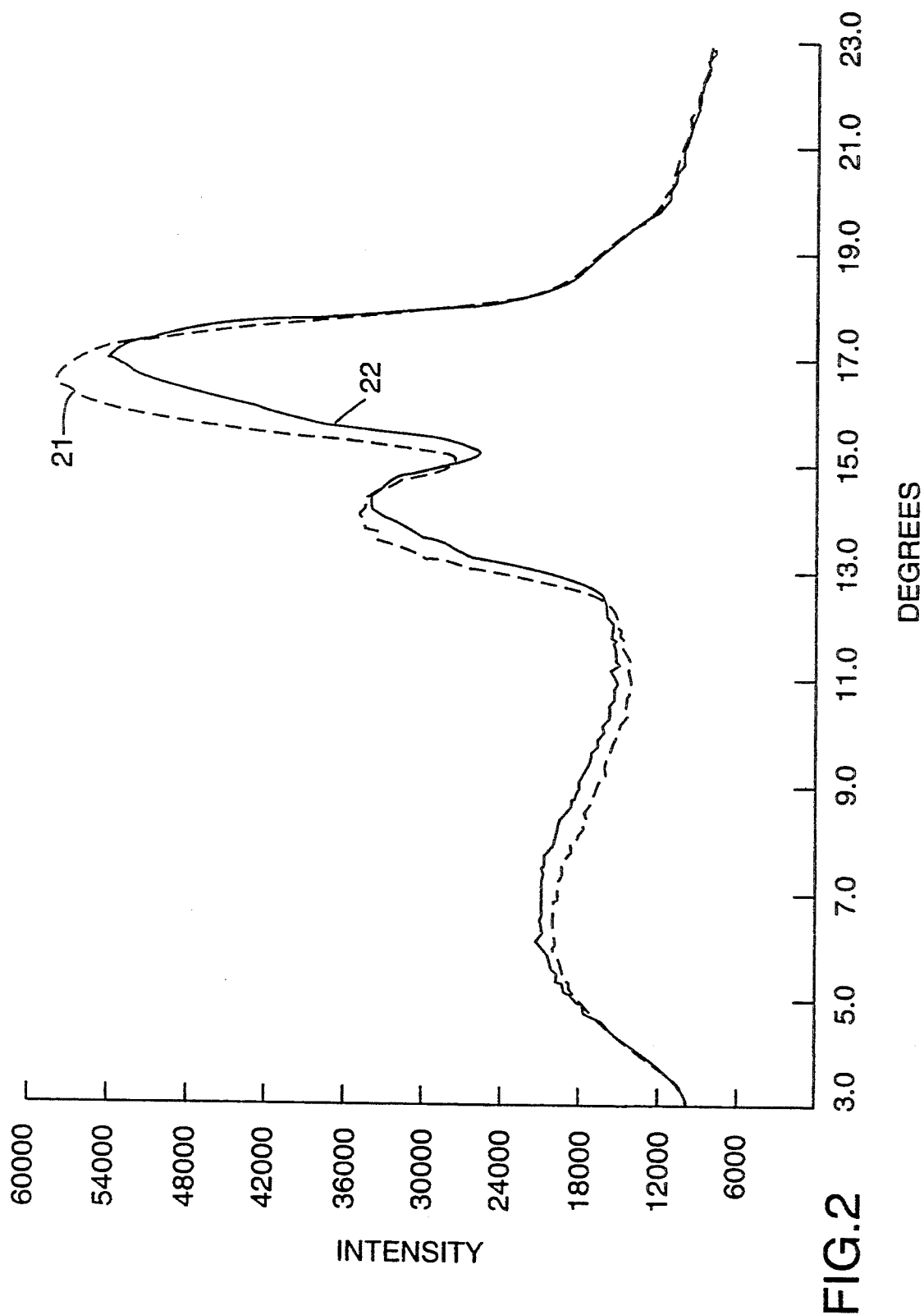
FIG. 2 are Glancing Wide Angle X-Ray Diffraction traces (GWAX) (1.0°) of the film of Example 2 on both a treated and a non-treated face.
Figure 3:
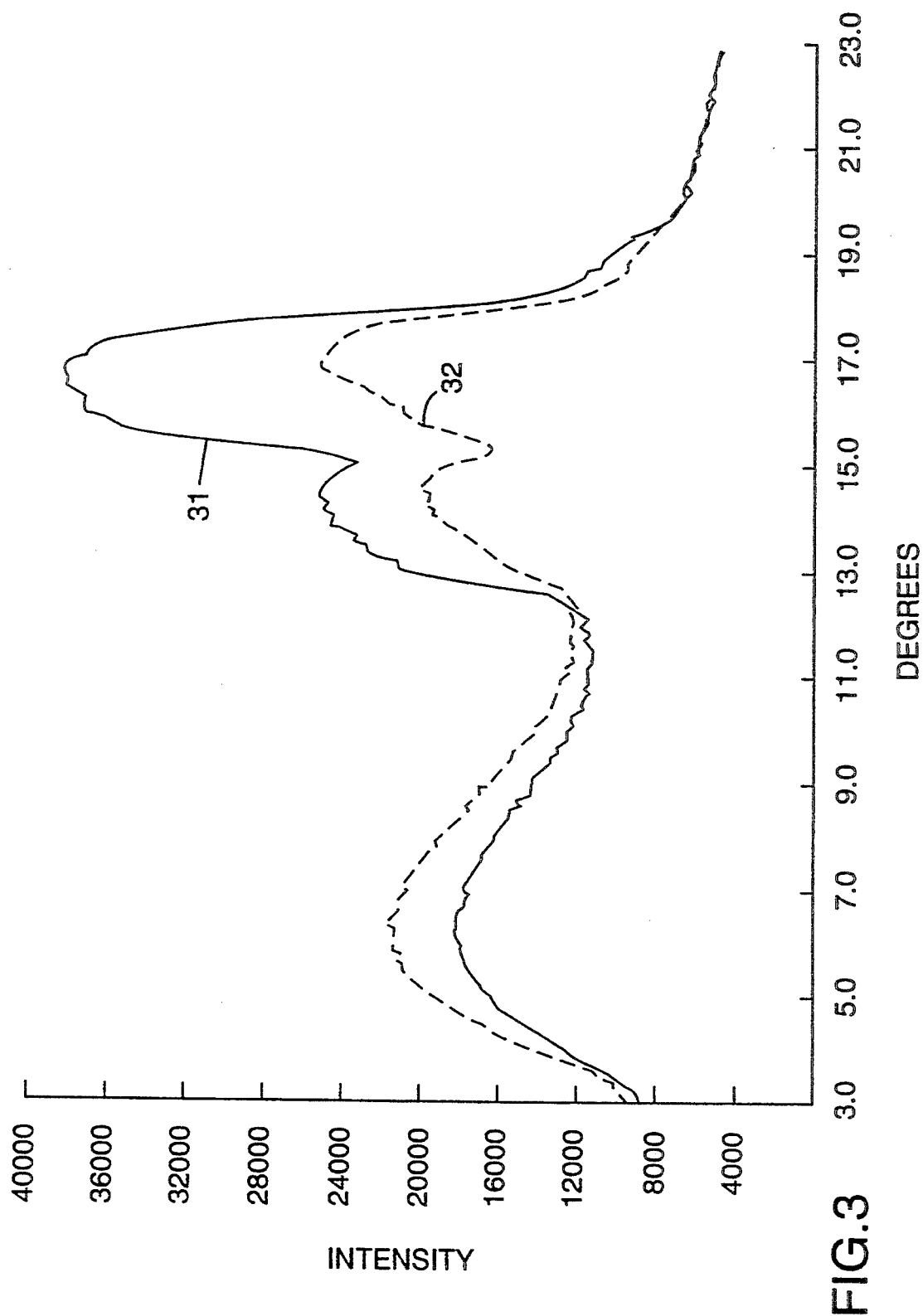
FIG. 3 are Glancing Wide Angle X-Ray Diffraction traces (0.5°) of the film of Example 2 on both a treated and a non-treated face.

The orientation and crystallization of the polymer in film 1 is retained in the treated surface layer, however at lower levels, as is depicted in the GWAX traces in FIGS. 2 and 3. The level of orientation retained in the treated layer is generally low but still present. In the GWAX traces of FIGS. 2 and 3 this retention of orientation is apparent by the differences in relative intensity for the two major peaks, which are generally of equal size if there is no orientation in the polymer layer tested. Crystalline structure is retained to a considerable extent (up to 60 to 96%) as determined by GWAX intensity and patterns (0.5° and 1.0°). No new crystalline peaks are typically formed, indicating the lack of change in crystalline structure or the creation of a purely amorphous polymer in the surface layer, as in U.S. Pat. Nos. 4,822,451 or 3,394,045. The 0.5° Glancing Wide Angle X-Ray diffraction pattern (GWAX) generally will show retention of at least 5–10 percent of the untreated face crystallinity, preferably at least 50 percent and up to 70 to 95 percent.

The crystalline size of the treated surface layer polymer is significantly reduced, coupled with the reduction in the overall degree of crystallinity and orientation. This is apparent from the decrease in softening point temperature of the treated surface polymer layer compared to the untreated bulk polymer of film 1. The lowering of the treated surface layer polymer softening point is demonstrated by significant self-adhesion bond strength of treated films, at the treated film surface layers, at heat seal temperatures 5° C., and more below the melting or softening point of the untreated oriented polymer of film 1. Films with treated surface layer(s) can exhibit self-adherence bond strength values at these lower heat seal temperatures, on the order of or higher than the bond strengths obtained with the untreated film welded at or near its softening point. The treated film can therefore be heat sealed without effecting the orientation and crystallinity of the untreated bulk polymer and without the associated loss in film strength at the joint as caused by welding. Adhesion of the invention treated film, at the treated surface layer, to other surfaces, such as polyolefins and copolymers, is also increased at these lower heat seal temperatures.

Although the crystalline structure of the treated surface layer is altered by the rapid topical heating of the film to temperatures well in excess of the melting point of the oriented polymer, the crystalline structure and associated properties are not lost as in conventional heat treatment. Further, the invention treatment process limits the penetration of the treatment to a surface layer having a thickness of less than about 20 microns (μm), preferably less than 15 microns, such that the treated layer is less than about 50 percent of the total film thickness and preferably less than 20 percent. This limits the loss of the orientated bulk polymer properties in the final treated film. The invention treatment has also been discovered to minimize polymer degradation and the associated creation of oxidized species, either on the film as treated, or by transfer of melted polymer to the textured heat treatment roll and back to the film.

The provision of a textured surface on the heated roll 5 in contact with the film 1 surface has been found to inhibit or prevent transfer of melted polymer to the roll, particularly with conventional chromed surfaces. The texture depth (Ra) is generally at least about 10 micro-inch (0.3 μm), and preferably about 20 micro-inch (0.5 μm), but less than 400 micro-inch (10.2 μm). Use of higher Ra or deeper textured rolls can result in uneven treatment of the film while lower Ra value rolls can result in film or polymer sticking to the roll. The use of release agent coatings, resistant to the high temperatures of the roll, are also advantageous to prevent polymer adhesion with certain high tack polymers. Suitable release treatments include TEFLON ™ (polytetrafluoroethylene) and other fluorochemical coatings.

The texture on the heated roll 5 is at least indirectly transferred to the surface layer of film 1 resulting in increased texturing and associated at least in part with a reduction in percent gloss at 60°, down to 30% and less, preferably to 15% and less. The gloss generally can be from 3 to 50%, however is preferably from 5 to 30%. The Ra values for the textured treated surfaces range from 20 to 500 micro-inch (μinch) (0.5–12.7 μm), preferably from 50 to 400 μinch (1.3–10.2 μm). Lower Ra values are not significant and higher Ra values are difficult to obtain while still obtaining effective continuous surface layer treatment at the desired thicknesses. A peak count of at least 50 peaks/inch (20 peaks/cm) is desirable, with 100 to 400 (39–157 peaks/cm) being preferred for a textured surface (measured as defined below). The highest texturing and reduction in gloss are obtained with non-release coated (e.g., chromed) heated roll surfaces, however, suitable release coatings may have to be employed with some polymers to avoid sticking of molten polymer to the heated roll and still obtain preferred texturing. Surface texturing of the treated surface layer is often demanded for uses where high gloss is not desirable, such as certain adhesive tape backings, or where the, e.g., film surface is coated. The invention surface texturing is sufficient to satisfy the texturing requirements for these typical uses, without the typical undesired chemical modification of the exterior surface layer, as one obtains with the heat treatments of U.S. Pat. Nos. 3,394,045 or 4,428,720 or the surface treatments summarized in Table 1 of U.S. Pat. No. 4,822,451.

The polymers suitable for the invention treatment are orientable thermoplastic polymers, generally semi-crystalline thermoplastic polymers such as polyolefins (e.g., polypropylene or polyethylene), polyesters, polyamides and the like. The polymer need only be capable of being heated to a suitable temperature above its melting point without sticking or transferring polymer to the heated roll at the high processing speeds of the invention process. Polyolefins are generally well suited, particularly polypropylene and copolymers, to the invention process without sticking to the heated roll. Certain polyesters, however, are of a higher tack when melted and tend to stick to the heated roll. Further, due to the relatively higher melt temperatures of these polyesters, conventional release agents generally cannot be used on the roll without undergoing degradation.

Due to the treated surface layer thicknesses (below 10 microns in some cases) the process can be used to treat very thin film or fiber webs (e.g., below 5 mils (100 μm), down to 1 to 3 mils (25–75 μm), if desired, without effecting the bulk properties of the oriented polymer of film 1 to any significant extent. The texture level of the heated treatment surface on, e.g., roll 5 should be matched to the treatment layer thickness, as determined by treatment temperature and exposure duration, to ensure substantially continuous contact between the melt phase of the surface layer and the heated textured surface during treatment.

The invention described above with respect to FIG. 1 is applicable to other webs or articles or could be practiced by other means. Further, the invention is exemplified by the following examples which set forth the currently contemplated preferred embodiments.

EXAMPLES

Example 1

This example describes a one to two mil (25–50 μm) thick film of biaxially oriented polypropylene (M.P. 170° C.) that was rapidly passed over a heated TEFLON ™ polymer coated roller. The roller was heated to a surface temperature of 250° C. The film surface visually had a textured appearance.

Example 2

This example describes a one mil (25 μm) thick film of biaxially orientated polypropylene (BOPP) polymer (M.P. 170° C.) that was passed over a heated TEFLON ™ (DuPont 958-203) polymer coated (1.5 mil, 38 μm, thick, polished to 30–50 micro-inch, 0.8–1.3 μm, Ra) roller at a speed of 75 feet per minute (fpm) (23 m/minute). The roller was heated to a surface temperature of 260° C. The web contacted about 2–4 mm of the roll surface. The film's surface finish was measured to be 57 micro-inch (1.4 μm) Ra with 105 peaks/inch (41 peaks/cm).

Measured using a Surtronic 3 Profilometer, (available from Taylor-Hosson, Leicester, England), #1502 stylus, long stroke, 50 bandwidth.

This film was tested for its auto adhesion using a heat sealing press set at 40 pounds/inch$^2$ (3 Kg/cm$^2$) and 1 second. The first noted bond strength (t-peel ASTM D1876-72) was at 300° F. (149° C.) and was about 3.4 pounds/inch (0.6 Kg/cm$^2$). An untreated film's first noted autoadhesion was at 340° F. (171° C.) and was about 0.3 pounds per inch (0.05 Kg/cm) using a 180 degree peel test as described below.

Counterexample 3

A one mil thick film of biaxially oriented polypropylene (M.P. 170° C.) was treated by passing the film at a web speed of 30 fpm (9 m/min) over a course-finished plasma coated roll (Plasma Coatings Inc., #315), 80–100 μ-inch (2–2.5 μm) Root Mean Squared (RMS) finish heated to a temperature of from about 280° C. to 290° C., with a roll outer surface temperature of from about 250° C. to 260° C. The web contacted about 2–4 mm of the roll surface. The surface finish was measured to be 435 micro-inch (11 μm) Ra with 75 peaks/inch (30 peaks/cm). The depth of the surface treatment was viewed from an edge-on perspective of a Scanning Electron Microscope (SEM) and appeared to be close to the thickness of the film, or approximately 25 microns. This film retained little of the bulk orientation of the original film.

Example 4

The film of example 2 was treated using a grit-blasted, chromed steel roll (Ultra Plating, Inc., 70 micro-inch (1.8 μm) Ra, 200-300 peaks/inch (79-118 peaks/cm)) at a web speed of 150 fpm (46 m/mim) and surface temperatures of from about 190° to about 200° C. About 2-4 mm of the roll was contacted by the web. The thus treated film has a surface finish of 70 micro-inch (1.8 μm) Ra with 230 peaks/inch (91 peaks/cm). The depth of the surface treatment of the film cross-section was measured by SEM to be about 4-5 microns. The percent gloss was measured to be 15 using a Gardner Gloss meter at a 60° angle, which would be considered a matte finished film.

The film surfaces, treated and untreated, were measured for crystallinity by GWAX as described in Physical Review Letters, 66(9), p 1181-1184 (1991) with both faces tested along the same axis relative to the orientation direction At 1°, the treated layer had 22% lower crystallinity than the untreated film face with 58% lower crystallinity at 0.5° GWAX. The GWAX peaks 110 [13.5° (2Θ)] and 040 and 130 [17 and 18.5 (2Θ)] were also asymmetrical on both faces indicating crystalline orientation of the polymer at both faces. The Example 2 film was similarly tested and displayed 12% and 50% lower crystallinity of the treated face at 1.0° and 0.5°, respectively (See FIGS. 2 and 3 which show the Example 2 scan traces where 21 and 31 are the untreated faces and 22 and 32 are the treated faces for 1.0 degree and 0.5 degree, respectively. The traces are of intensity vs. 2-Theta.)

The textured face of this film was also laminated to a blown high density polyethylene film (2 mil (51 μm), Consolidated Thermoplastics) in a heat sealing press set at 30 pounds per inch$^2$ (2 Kg/cm$^2$) and 300° F. (149° C.) for 1.5 seconds. The samples were anchored using a double coated tape and a rolldown of 4.5 lbs (2.1 Kg) and subjected to an 180° peel test at a peel rate of 12 inch/minute (30 cm/min), giving a peel force of 250 grams/inch (0.98 Kg/cm). An untreated film, similarly laminated to this same blown film, gave a peel force value of 10 grams/inch (0.04 Kg/cm).

Example 5

The film of Example 2 was treated by passing the film over a grit-blasted chromed steel roll (Ultra Plating, Inc., 50 micro-inch (1.3 μm) Ra, 200-300 peaks/inch (79-118 peaks/cm)) at a web speed of 150 fpm (46 m/min) and surface temperatures of from about 190° to 200° C. About 2-4 mm of the roll was in contact with the web. The treated thickness was measured by SEM and found to be from about 3 to about 7 microns. The surface roughness was measured to be 61 micro-inch (1.6 μm) Ra, 260 peaks/inch (102 peaks/cm). The percent gloss, measured at 60°, was found to be 14. This gave the film a matte finished appearance.

Example 6

The film of example 2 was treated by passing the film over a grit-blasted chromed steel roll (Ultra Plating, Inc., 35 micro-inch (0.9 m) Ra, 200-300 peaks/in (79-118 peaks/cm)) at a web speed of 200 fpm (61 m/min) and surface temperatures of from about 190° to 200° C. About 2-4 mm of the roll was in contact with the web. The treated thickness was measured by SEM and found to be from about 3 to about 6 microns. The surface roughness was measured to be 54 micro-inch (1.4 μm) Ra, 260 peaks/inch (102 peaks/cm). The percent gloss, measured at 60°, was found to be 14. This gave the film a matte finished appearance. This film was not uniform due to sticking of the film to the roll surface which was due to the low Ra value of the heated roll.

Comparative Example 7

The film of example 2 was treated in a manner as taught in U.S. Pat. No. 4,495,124. By passing the one mil biaxially orientated polypropylene polymer film over the highly polished, chromed steel roll (Ultra Plating, Inc., 8-10 micro-inch (0.2-0.26 μm) finish) at web speed of 30 fpm (9 m/min) with a roll surface temperature of about 180° C. No material could be treated because the film stuck to the heated roll surface in the nip. This dwell time is similar to the fastest dwell times described in the above patent. The process as described in this patent may well be suited to thick, uniaxially oriented webs but was not found suitable for treating thin, biaxially or uniaxially oriented webs to provide heat sealable oriented material.

The various modifications and alterations of this invention will be apparent to those skilled in the art without departing from the scope and spirit of this invention, and this invention should not be restricted to that set forth herein for illustrative purposes.

I claim:

1. A thin heat sealable oriented thermoplastic article comprising film or film layer of a multilayer film, said film or film layer polymer having a crystalline or semi-crystalline structure and having a heat sealable treated surface layer or layer region of the same polymer, said treated surface layer or layer region being from about 1 to 15 microns thick and having a similar type of crystalline structure, a lower amount of crystallinity and a lower softening point, compared to the untreated film or film layer polymer.

2. The thermoplastic article of claim 1 comprising a film or film layer, wherein the treated surface layer or region polymer has a softening point temperature at least 3° C. below that of the untreated film or film layer polymer and the film or film layer polymer comprising a polyolefin polymer, copolymer or blend.

3. The thermoplastic article of claim 1 wherein the treated surface layer or region polymer has a softening point temperature at least 5° C. below that of the untreated film or film layer polymer.

4. The thermoplastic article of claim 1 wherein the treated surface layer or region polymer has a softening point temperature at least 5° C. below that of the untreated film or film layer polymer and has at least 5% lower crystallinity than the untreated polymer as measured by Glancing Wide Angle X-Ray Diffraction.

5. The thermoplastic article of claim 2 wherein the treated surface layer or region polymer has a softening point temperature at least 5° C. below that of the untreated material polymer and 30 to 95% lower crystallinity than the untreated film or film layer polymer, and the polyolefin comprises a polypropylene polymer or copolymer.

6. The thermoplastic article of claim 2 wherein the surface layer or region comprises 5 to 100% of at least one outer surface of said film or film layer.

7. The thermoplastic article of claim 1 wherein the surface layer or region comprises 5 to 100% of at least one outer surface of said film or film layer.

8. The thermoplastic article of claim 6 wherein the surface layer or region polymer has less than 2% oxygen at the outer surface thereof.

9. The thermoplastic article of claim 8 wherein the surface layer or region polymer has less than 1% oxygen at the outer surface thereof.

10. The thermoplastic article of claim 2 wherein the surface layer or region has an Ra value of from about 20–500 μinch.

11. The thermoplastic article of claim 10 wherein the surface layer or region has an Ra value of from about 50–400 μinch.

12. The thermoplastic article of claim 10 wherein the surface layer or region has a peak count of at least 50 peaks/inch at 50 bandwidth as defined herein.

13. The thermoplastic article of claim 12 wherein the surface layer or region has a peak count of from 100 to 400 peaks/inch.

14. The thermoplastic article of claim 10 wherein the surface layer or region has a gloss of from 3 to 50% (at 60°).

15. The thermoplastic article of claim 10 wherein the surface layer or region has a gloss of from 5 to 30% (at 60°).

16. The thermoplastic article of claim 2 further comprising a layer of pressure-sensitive adhesive on at least one outer face thereof.

17. The thermoplastic article of claim 16 wherein said pressure-sensitive adhesive layer is a continuous layer covering substantially all of said at least one outer face.

18. The thermoplastic article of claim 17 wherein the opposing face is coated with a release layer.

19. The thermoplastic article of claim 2 wherein the film or film layer has a thickness of less than 5 mils.

* * * * *

UNITED STATES PATENT AND TRADEMARK OFFICE
CERTIFICATE OF CORRECTION

PATENT NO. : 5,411,788
DATED : May 2, 1995
INVENTOR(S) : Patrick D. Hyde and Andrew J. Ouderkirk It is certified that error appears in the above-indentified patent and that said Letters Patent is hereby corrected as shown below:

Column 4, line 50, Insert a comma (,) after "more".

Column 7, line 13, "46 m/mim" should read --46 m/min--.

Column 7, line 27, "direction At" should read --direction. At--.

Signed and Sealed this

Thirtieth Day of July, 1996

Attest:

BRUCE LEHMAN

Attesting Officer

Commissioner of Patents and Trademarks